United States Patent Office 3,709,975
Patented Jan. 9, 1973

3,709,975
METHOD FOR THE OXIDATION OF BLACK LIQUOR
Carl D. Amsden, Orange, Tex., and Sergio F. Galeano, Toledo, Ohio, assignors to Owens-Illinois, Inc.
Filed May 28, 1970, Ser. No. 41,253
Int. Cl. C01d 5/00; C01b 17/64
U.S. Cl. 423—206                              10 Claims

ABSTRACT OF THE DISCLOSURE

A continuous process for the molecular oxygenation of black liquor by the uninterrupted steps of oxidizing the black liquor in a first oxygenation reactor, next, continuously oxidizing the liquor in a tubular conduit acting as a reactor connecting the first reactor to a second oxygenation reactor, and continuously oxidizing the liquor in the second reactor, then transferring the liquor to a storage area wherein the liquor is maintained under oxidizing conditions while it is simultaneously oxidized in the storage tanks to produce an oxidized black liquor.

BRIEF DESCRIPTION OF THE INVENTION

The present invention relates generally to the production of wood pulp. Specifically, the present invention pertains to the treatment of a spent liquor for the recovery of chemicals therefrom, the control of odorous sulfur emissions and the reduction of foaming which occurs during the chemical treatment of the spent liquor. Specifically, the present invention concerns an improved process for the oxidation of the sulfide content of the spent or black liquor resulting from the digestion of wood.

The process of the invention, while it is applicable to treating any kind of spent, sulfide-containing liquor, is advantageously suitable to the oxidation of a weak black liquor or a strong black liquor produced from the pulping in the art known kraft or sulfate processes. The weak or spent black liquor produced in a kraft process generally can be defined as a liquor containing from about 12% to 16% solids in said liquor. In the case of a strong black liquor, the liquor generally contains about 30% to 40% solid contents. The present systems for the oxidation of a spent black liquor generally uses air as the oxidizing agent. In the oxidation of either a weak or strong black liquor by air in the prior art, there is usually created a considerable amount of foam that has to be controlled by the addition of chemical anti-foamers or the breakdown of the freshly produced foam by mechanical means or foam separators in a seemingly complicated and often expensive solutions. In the case of weak spent liquor produced in the southern pine processes, the amount of foam has seriously deterred its application in mills using this type of wood. Also, in the case of the oxidation with air of a weak black liquor, the possibilities of a reversion of a process to some extent is present due to the formation of elemental sulfur. Accordingly, the industrial application of the oxidation of a weak or spent black liquor produced from a southern pine process, has not received any application to date.

Black liquor oxidation is generally regarded by the art as one of the most beneficial processes in the conventional known recovery system for recovering sulfur values therefrom and as a means to control the air pollution created by the gaseous or sulfur emission produced in a recovery system. It is apparent that the recovery of sulfur compounds from a spent liquor helps to keep the cost of the pulping process substantially low. However, oxidation by air by present process of the spent liquor also along with chemical recovery generates an undesirable odor in the oxidation tower which detracts from the important use and the beneficial achievement of the oxidation process. Another additional problem that faced the prior art in the oxidation of a spent black liquor using air as the oxidizing agent, was the unacceptable oxidizing efficiencies that were obtainable by these processes, usually in the range of about 55% to 70% oxidation of the spent black liquor. Yet another objectionable characteristic of the present air oxidation system is the excessive formation of foam and the need of expensive and troublesome expensive foam breaking devices to essentially control this problem. In some cases, as in the air oxidation of weak black liquor from kraft southern pine processes, the foam problem has been unsurmountable and thus prevented the acceptance of air oxidation systems. Another objectionable feature during oxidation of the black liquor is a tendency to form elemental sulfur which later recombines to sulfide again, known as reversion which detracts from the efficiency of the process.

Accordingly, in view of the above, it is an immediate object of the present invention to provide a method for the oxidation of sulfide content in a spent liquor produced in a chemical digestion process of wood.

Another object of this invention is to improve the oxidation of the weak spent liquor produced in the cooking process of sulfate or kraft pulping.

Yet another object of the invention is to improve the oxidation of a strong spent liquor produced in a cooking process known to the prior art.

Still another object of the invention is to oxidize the sulfide content of weak or strong black liquor produced in the pulping of southern pine with an increased oxidation efficiency not heretobefore attainable in the prior art.

Yet another object of the present invention is to provide a novel system for the oxidation of a black liquor including the use of the apparatus for the oxidation of a spent liquor containing the oxidation of the sulfide in a less expensive fashion, and most adaptable to present recovery systems.

Other objects of the invention relate to the improvement of the product recovery and reduction in odors and sulfur emission from the plant stacks and in the discharge of the recovery process.

Still yet a further object of the invention is to essentially oxidize the black liquor without the formation of foam and without the need for any costly and troublesome foaming controlling equipment.

Yet still another object of the invention is to achieve oxidation of the sulfide content of the black liquor without formation of elemental sulfur.

These and other objects of the invention will become more readily apparent with reference to the following disclosure and accompanied diagram, which shows a combined plant and apparatus type design for the oxidation treatment of the spent black liquor.

DETAILED DESCRIPTION OF THE INVENTION

In attaining the objects, features and advantages of this invention, by the oxidation of a black liquor, it has now been unexpectedly found that the inventive process can be performed by using the presently commercially available equipment, such as storage tanks, multiple evaporators, flash tanks and the like to oxidize a spent weak or spent black liquor. The invention as set forth hereinafter, essentially eliminates the formation of any additional amount of foam in an oxidation process and it also concurrently therewith uses transfer pipelines from the digested area to the storage tank area as a tubular reactor for the continuous, successive oxidation of the spent liquor. By employing the process of this invention, there is essentially an elimination of additional odorous emissions of the methyl disulfide or the mercaptan type of compounds from the oxidation process, as produced under the present prior art air oxidation system of a black liquor. The present invention also affords a more rapid oxidation of sulfides to the thiosulfate, with the elimination of the need for any large storage tank or large sized reactor. In the accompanying schematic drawing, the only drawing in the application, the detailed graphic description of an example of the plant scale operation in which a spent liquor containing 12% to 16% solids, was oxidized at a flow rate ranging from 900 gallons per minute to 1560 gallons per minute, was carried out and the results obtained demonstrated an improved and unobvious process for the treatment of spent black liquor. In the figure, 1 represents the digesting pulp area and washing area (not shown) wherein the black liquor is separated from the pulp. After the separation of the liquor from the pulp, the black liquor is conveyed through pipelines 2 to flashtanks 3. Steam, entering flash tanks 3 through pipe 3a flashes the liquor from flashtanks 3 through, by means of inline pumps and control valves, designated as P and V respectively in line 4, to storage tanks 19. For the purpose of uniformity, the letters "P" and "V", as used in the drawings, are to be construed as an in-line pump and an in-line control valve respectively. In this figure, the pumps and vaves in pipeline 4 are also labeled 5 and 5a immediately before they enter into pipeline 6. The solid content of the liquor is generally about 12% to 16% by weight and the temperature of the liquor is about 210° F. The temperature should advantageously for the liquor be kept above 180° F. to guarantee oxidation of the sulfide to the desired thiosulfate. When the temperature is less than 180° F., the possibility is present for the formation of elemental sulfur. The elemental sulfur thus formed will tend to revert to sulfide according to the equation:

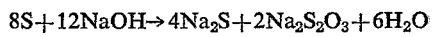

$$8S + 12NaOH \rightarrow 4Na_2S + 2Na_2S_2O_3 + 6H_2O$$

The occurence of this reaction will essentially lessen the beneficial effect of the black liquor oxidation and the present invention avoids this phenomenon known to the prior art as "reversion." As the black liquor is flashed from tanks 3 through pipes 4 by means of pumps 5 and valve 5α, it enters a common pipeline 6 which conveys the black liquor into a multi-stage tubular reactor labeled 7 and 17, respectively.

Molecular oxygen is introduced into the tubular reactor 7 and 17 by pipeline 8 through inline valve 37. The molecular oxygen may come directly from an oxygen plant, not shown, through conduit 9 or the liquor oxygen could be transferred from a liquid oxygen storage tank 11 through a vaporizer 10, which vaporizer connects to pipeline 8. The storage tank 11 can suitably be recharged with oxygen through feed means 13 which connects to an oxygen truck or supply line by pipeline 12. The liquid oxygen, as it enters reactor 7, produces a violent mixing and corresponding turbulence with an oxidation of the liquor and the reactor. The oxidation continuously takes place along pipeline 14 which is connected to a second reactor and in reactor 17, which also receives liquid oxygen by pipeline 16, suitably joined to oxygen feed pipeline 8. The oxidation further takes place along pipeline 18 that conveys essentially oxidized liquor from reactor 17 and into storage tanks 19. Thus, there is a continuous oxidation of the spent liquor after it is flashed from the flashtanks into the multi-stage reactor and wherein it meets oxygen until it enters the storage tanks. In addition, the oxidation of the spent liquor also takes place in a more efficient manner, because of pipeline 15, which connects the second stage reactor 17 to incoming liquor supply 6 so that oxidized liquor is mixed with unoxidized liquor to start its oxidation and to increase its reactivity. That is, the completely oxygenated black liquor and, some (about 10%) of the unoxygenated black liquor present in line 6 is contacted in oxygenation reactor 17 to be again oxygenated by means of oxygen gas supplied through oxygenation pipeline 16 prior to eventual conveyance to storage tanks 19, through pipeline 18. Thus, because of the presence of large amounts of excess oxygen, some oxygenation may conceivably take place in storage tanks 19. The oxygenated black liquor is next pumped by pumps 20 through valve 20a into pipelines 21 from the storage tanks 19 for retention in feed tank 22. Feed tank 22 has an inline exit valve system 23a and a pump 23 for feeding or conveying the oxidized black liquor through pipeline 21a to a series of multiple effect evaporators. The multi-stage, tubular reactor, identified above as 7 and 17, with its tubes 14, 15 and 16, could also be advantageously inserted in line 21a after valve 23a. Thus, there could be an alternative location for the oxygenation tubular reactor for the oxygenation of the weak black liquor; if not possible after the flash tanks, then it could be achieved after the liquor leaves the feed tank 22 and before it enters an evaporator system. The storage tanks 19 and the feed tanks 22 will be insulated with insulated walls to prevent the temperature from dropping below 180° F.

The oxidized black liquor confined in feed tank 22 is next transferred through inline valves 23a and by pump 23 and into pipeline 21a for further treatment in a multiple effect evaporator system. The multiple effect evaporator used for the purpose of this invention is a conventional multiple effect evaporator system. The system consists of a plurality of evaporators connected in series for progressively evaporating or concentrating the spent oxidized black liquor. The usual method is to feed the liquor to the multiple evaporator system by pumping the liquor, for example, the oxidized black liquor, into the first effect or series of evaporators and then sending the liquor in turn through another effect or series of evaporators. Next, the just evaporated liquor can be subsequently evaporated in the remaining evaporators and finally transferred to a storage tank. This system is called a forward feed evaporating system. The concentration of the liquor increases from the first effect to the last effect. This system and other like systems are well-known to the art and they are described in conventional chemical engineering handbooks such as Unit Operations of Chemical Engineering, by Sidney D. Kirkpatrick, McGaw-Hill Series, Chemical Engineering, 1956, pages 555 through 571.

In the system described in the accompanying drawing, the oxidized black liquor enters the multiple evaporator system by pipeline 21a and is divided into entry pipelines 21b and then into two multiple effect evaporators 24. The liquor is first partially evaporated therein and it next leaves multiple effect evaporator 24 by pipeline 25c where it is conveyed to evaporator 25a. The first two evaporators in series are designated as 24, and they are connected to each other by conduit 24a. After treatment, in evaporator 25a, the oxidized black liquor present in 25a is conveyed from 25a by pipeline 25 into a storage tank 26. Evaporators 25a are suitably connected to each other by pipeline 25c for transporting the concentrated liquor into the next series of evaporators. The combination of proper solids content and common ion effect permits the separation of soap in storage tank 26 and its transfer to soap tank 27, suitably connected to tank 26 by conduit 28. Further evaporation treatment of the liquor is obtained by conveying the oxidized liquor from storage tank 26 through conduit 29 suitably equipped with inline valve 29b and pump 29a. Pump 29a forces the oxidized liquor into a second serial evaporator effect 31. The evaporated liquor is further concentrated and it leaves evaporator 31 by pump 30, through inline valves 30a, which convey the liquor through conduit 30b into evaporator 32. Evaporator 32 is connected by conduit 32a to another evaporator 34. The later serial evaporator 34 is equipped with a discharge means whereby the now concentrated oxidized black liquor may leave the multiple effect evaporator system by pipeline 34a through inline valve 35a by pump 35 for transfer to storage area 36 (not shown).

If so desired, the oxidation scheme previously described for the weak black liquor could be performed in the partially concentrated liquor being pumped by pump 35. For this alternative route, the same multi-stage tubular reactor, identified above as 7 and 17, with its tubes 14, 15 and 16, could also be inserted after pump 35 wherein the unoxidized black liquor concentrated to 30 to 40 percent solids, will be oxidized prior to its storage in area 36 (not shown).

The following examples and tables are further representative of the embodiments of the invention and these examples and tables are not to be construed as limiting, as these and other obvious embodiments will be readily apparent to those versed in the art from a reading of the disclosure, its drawings, examples, tables and appended claims.

EXAMPLE I

In a conventional pulping mill southern pine was cooked to produce a kraft pulp at a rate of approximately 900 tons of pulp a day. The spent liquor obtained by the pulping of the southern pine was oxidized by the above-described method over a period of several weeks. The unoxidized liquor flow rate was between 650 gallons per minute to 1670 gallons per minute, and the oxygen had a flow rate of about 8,000 to 44,000 cubic feet per hour. The liquor was treated with molecular oxygen and, after oxidation, it was evaporated according to the above-described system and the accompanying figure. In the Table I, presented immediately below, the results are set forth for the continuous oxidation of a black liquor. In Table I, "B. Liq.," means black liquor; "CFH" means standard cubic feet per hour; "g.l." means grams of sulfide per liter; "S=Oxid" means pounds of moles per hour of sulfide oxidized; "$O_2$ injec." indicates the amount of molecular oxygen injected into the black liquor expressed in pound moles per hour, "lb. moles/hr." is to be construed to mean pound moles per hours; and "Overall Effic. percent" means the percent of sulfide oxidized to indicate the efficiency of the system. "First, Second, Third, etc." indicates the day and the time represents the time at which the liquor was analyzed.

TABLE I

| Days | Time, hour | B. Liq., g.p.m. | Oxygen, CFH | Sulfide, lb. moles/hr. | | | | $O_2$ injec. | Overall effic., percent |
| --- | --- | --- | --- | --- | --- | --- | --- | --- | --- |
| | | | | In, g./l. | Out, g./l. | Oxid., g./l. | S=oxid. | | |
| First | 11:27 | 1,200 | 28,630 | 10.15 | .88 | 9.27 | 74.16 | 79.59 | 93.2 |
| | 3:23 | 1,310 | 29,504 | 11.3 | .97 | 10.33 | 86.61 | 82.02 | |
| | 4:34 | 1,215 | 27,985 | 9.65 | .68 | 8.97 | 69.75 | 77.80 | 89.5 |
| | 9:35 | 1,150 | 29,200 | 9.90 | 1.25 | 8.65 | 63.66 | 81.18 | 78.5 |
| Second | 5:40 | 1,295 | 26,887 | 10.70 | 3.12 | 7.58 | 62.82 | 74.75 | 84.0 |
| | 7:30 | 1,295 | 27,310 | 11.70 | 3.70 | 8.00 | 66.38 | 75.92 | 87.6 |
| | 12:16 | 1,430 | 29,447 | 11.65 | 4.00 | 7.65 | 70.01 | 81.86 | 85.6 |
| Third | 2:50 | 670 | 11,264 | 10.53 | 4.29 | 6.24 | 26.76 | 31.31 | 85.5 |
| | 4:20 | 670 | 11,264 | 11.30 | 6.63 | 4.67 | 20.02 | 31.31 | 64.5 |
| | 5:30 | 780 | 14,641 | 11.30 | 5.10 | 6.20 | 30.95 | 40.70 | 76.0 |
| | 6:13 | 780 | 16,268 | 12.00 | 5.26 | 6.74 | 33.65 | 45.22 | 74.5 |
| | 8:45 | 1,235 | 20,326 | 12.68 | 5.07 | 7.61 | 60.15 | 56.51 | |
| | 9:55 | 1,235 | 22,557 | 10.14 | 4.09 | 6.05 | 47.82 | 62.71 | 76.4 |
| | 12:42 | 1,430 | 23,518 | 9.32 | 3.12 | 6.20 | 56.74 | 65.38 | 87.0 |
| Fourth | 12:25 | 1,495 | 24,263 | 9.56 | 3.51 | 6.05 | 57.89 | 67.45 | 85.8 |
| | 2:15 | 1,395 | 35,792 | 11.02 | 1.56 | 9.46 | 84.46 | 99.50 | 85.0 |
| | 4:12 | 1,355 | 35,728 | 10.73 | 1.85 | 8.88 | 77.01 | 99.32 | 77.7 |
| | 5:15 | 1,395 | 35,427 | 9.16 | 1.37 | 7.79 | 69.55 | 98.49 | 70.7 |
| | 7:05 | 1,355 | 36,624 | 9.94 | 0.27 | 9.67 | 83.86 | 101.81 | 82.4 |
| | 9:28 | 1,395 | 38,395 | 9.75 | 0.12 | 9.63 | 85.98 | 106.74 | 81.0 |
| | 5:08 | 1,495 | 39,220 | 10.04 | 1.26 | 8.78 | 84.01 | 109.03 | 77.0 |
| | 9:23 | 1,480 | 38,553 | 10.53 | 1.36 | 9.17 | 86.86 | 107.18 | 81.2 |
| Fifth | 10:12 | 1,355 | 35,011 | 11.51 | 3.12 | 8.39 | 72.76 | 97.33 | 75.2 |
| | 3:40 | 1,355 | 38,575 | 10.92 | 1.46 | 9.46 | 82.04 | 107.24 | 76.8 |
| | 5:00 | 1,355 | 43,342 | 10.9 | .23 | 10.67 | 92.53 | 120.49 | 77.2 |
| | 5:15 | 1,355 | 43,342 | 10.8 | .40 | 10.40 | 90.19 | 120.49 | 75.0 |
| | 6:00 | 1,355 | 43,364 | 10.6 | .20 | 10.40 | 90.19 | 120.55 | 75.0 |
| | 6:33 | 1,355 | 41,177 | 10.34 | .35 | 9.99 | 86.63 | 114.47 | 75.5 |
| | 8:00 | 1,375 | 40,302 | 10.3 | .15 | 10.15 | 89.32 | 112.04 | 79.8 |
| Sixth | 1:10 | 1,395 | 39,532 | 10.3 | .24 | 10.06 | 89.82 | 109.90 | 81.9 |
| | 7:46 | 1,395 | 37,176 | 10.53 | 2.24 | 8.29 | 74.01 | 103.35 | 72.0 |
| | 11:00 | 1,395 | 39,170 | 11.12 | 1.09 | 10.03 | 89.55 | 108.89 | 82.1 |
| | 4:15 | 1,525 | 41,528 | 10.34 | .20 | 10.14 | 98.97 | 115.45 | 85.8 |
| | 8:29 | 1,560 | 44,009 | 10.34 | 1.09 | 9.25 | 92.35 | 122.34 | 75.5 |
| | 11:42 | 1,560 | 42,876 | 10.76 | 1.95 | 8.81 | 87.96 | 119.20 | 73.6 |
| Seventh | 9:28 | 895 | 24,270 | 11.04 | 3.00 | 8.04 | 46.11 | 67.47 | 69.0 |
| | 11:37 | 895 | 24,300 | 11.90 | 3.00 | 8.90 | 50.98 | 67.55 | 75.5 |
| | 1:08 | 895 | 30,340 | 11.90 | .20 | 11.70 | 67.02 | 84.34 | 79.5 |
| | 4:30 | 950 | 31,641 | 12.60 | .48 | 12.12 | 73.69 | 87.96 | 84.4 |
| Eighth | 3:07 | 1,590 | 41,608 | 14.5 | 2.68 | 11.82 | 120.28 | 115.67 | *88.0 |
| | 10:27 | 1,650 | 43,773 | 14.5 | 3.50 | 17.00 | 116.0 | 121.69 | *79.0 |
| | 10:05 | 1,495 | 40,095 | 10.90 | .70 | 10.20 | 97.59 | 111.46 | 87.5 |
| Ninth | 12:32 | 1,055 | 33,362 | 13.60 | 2.10 | 11.50 | 77.65 | 92.75 | 83.8 |
| | 1:13 | 950 | 26,285 | 11.30 | .75 | 10.55 | 64.14 | 73.07 | 87.5 |
| | 9:09 | 895 | 30,322 | 13.80 | 2.68 | 11.12 | 63.70 | 84.30 | 75.5 |
| | 2:42 | 895 | 30,774 | 12.75 | .78 | 11.97 | 68.56 | 85.55 | 80.2 |
| | 9:42 | 1,670 | 44,640 | 11.60 | 1.65 | 9.95 | 106.35 | 124.10 | 85.8 |
| Tenth | 9:50 | 1,525 | 41,607 | 12.10 | 1.76 | 10.34 | 100.92 | 115.67 | 87.3 |
| Eleventh | 7:50 | 1,150 | 34,674 | 14.7 | .80 | 13.90 | 102.30 | 96.39 | 87.5 |

In Table I, asterisk indicates a correction was made for an unusual high concentration of Na₂S. The concentration of the sulfide in the black liquor prior to its molecular oxidation evidenced a measured concentration of 9 grams of sulfide per liter of black liquor to 15 grams of sulfide per liter of black liquor. The sulfide content of the oxidized black liquor had a range of 0.20 gram per liter to 4.30 grams of sulfide per liter.

EXAMPLE II

In this example the liquor was analyzed to determine the sulfur components of the spent liquor before and after oxidation. The results indicate that some of the sulfides go to thiosulfate, with a negligible amount going to the undesirable sulfate form. In Table II, the designation "I" indicates the concentration of the respective ingredients before the black liquor is oxidized, as set forth under the heading "Position," that is, at the inlet "I" to the oxidation reactor, and "O" represents the respective components and the concentration of the components after oxidation or after the liquor leaves the reactor.

TABLE II.—BLACK LIQUOR OXIDATION—BALANCE OF SULFUR SPECIES BEFORE AND AFTER OXIDATION

| Date | Time | Position | Sulfur balance, conc. species as S⁻(g./l.) | | | |
|---|---|---|---|---|---|---|
| | | | S⁻ | S₂O₃⁻ | SO₄ | Total |
| First | ¹11:27 | Inlet | .410 4.57 | .405 0.67 | .225 0.34 | 5.58 |
| | 11:34 | Outlet | .36 | 4.61 | .51 | 5.48 |
| | ²3:23 | Inlet | 4.63 | .76 | .58 | 5.97 |
| | 3:30 | Outlet | .40 | 4.41 | .54 | 5.35 |
| Second | ¹7:30 | Inlet | 4.80 | .83 | .91 | 6.54 |
| | 7:46 | Outlet | 1.52 | 3.39 | 1.13 | 6.04 |
| | ²12:16 | Inlet | 4.78 | .86 | .61 | 6.25 |
| | 12:22 | Outlet | 1.60 | 3.78 | .59 | 5.97 |
| Third | 1:27 | Inlet | 5.44 | 1.09 | .58 | 7.11 |
| | 1:35 | Outlet | 2.24 | 3.26 | .67 | 6.17 |
| | 1:40 | Inlet | 4.40 | .96 | .57 | 5.93 |
| | 1:45 | Outlet | 1.84 | 3.62 | .63 | 6.09 |
| | 2:50 | Inlet | 4.32 | .96 | .56 | 5.84 |
| | 2:58 | Outlet | 1.76 | 3.87 | .65 | 6.28 |
| | 4:20 | Inlet | 4.63 | .86 | .60 | 6.09 |
| | 4:34 | Outlet | 2.72 | 2.97 | .63 | 6.32 |
| | 9:55 | Inlet | 4.16 | .74 | .52 | 5.42 |
| | 10:03 | Outlet | 1.68 | 2.98 | .61 | 5.27 |
| | 11:12 | Inlet | 3.82 | .77 | .45 | 5.04 |
| | 11:19 | Outlet | 1.28 | 2.94 | .57 | 4.79 |
| Fourth | ¹5:15 | Inlet | 3.76 | .83 | .51 | 5.10 |
| | 5:24 | Outlet | 0.56 | 3.68 | .68 | 4.92 |
| | 7:05 | Inlet | 4.08 | .70 | .51 | 5.29 |
| | 7:14 | Outlet | 0.11 | 4.35 | .70 | 5.16 |
| | 9:28 | Inlet | 4.00 | 1.06 | .62 | 5.68 |
| | 9:38 | Outlet | 0.05 | 4.80 | .70 | 5.55 |
| | ²5:08 | Inlet | 4.12 | 1.15 | .47 | 5.74 |
| Fifth | 5:05 | Outlet | 0.52 | 4.22 | .61 | 5.39 |
| | 9:23 | Inlet | 4.32 | .83 | .50 | 5.65 |
| | 9:25 | Outlet | .56 | 4.80 | .68 | 6.04 |
| | ¹7:46 | Inlet | 4.32 | .83 | .50 | 5.65 |
| | 7:50 | Outlet | .92 | 4.48 | .63 | 6.03 |
| | 11:00 | Inlet | 4.56 | .80 | .53 | 5.89 |
| | 11:08 | Outlet | .45 | 4.35 | .70 | 5.50 |
| | ²4:15 | Inlet | 4.24 | .64 | .52 | 5.40 |
| | 4:27 | Outlet | .08 | 3.68 | .73 | 4.49 |
| | 8:29 | Inlet | 4.24 | .64 | .48 | 5.36 |
| Sixth | 3:30 | Inlet | 5.76 | .70 | .46 | 6.92 |
| | 3:35 | Outlet | .88 | 3.77 | .63 | 5.28 |
| | 4:30 | Inlet | 5.17 | .70 | .40 | 6.27 |
| | 4:37 | Outlet | .20 | 3.71 | .60 | 4.51 |
| Seventh | ¹3.07 | Inlet | 5.94 | .71 | .41 | 7.06 |
| | 3:12 | Outlet | 1.07 | 3.97 | .50 | 5.54 |
| Eighth | ²3:35 | Tank | .62 | 4.19 | .95 | 5.76 |
| Ninth | ³6:12 | Tank | .91 | 4.73 | .61 | 6.25 |
| Tenth | ¹11:11 | Tank | .19 | 4.61 | .63 | 5.43 |
| Eleventh | ²4:40 | Tank | .43 | 4.67 | .79 | 5.80 |

¹ A.m.
² P.m.

EXAMPLE III

In the following table, Table III, the results are set forth that indicate that the utilization of excess molecular oxygen used in the invention set forth herein prevents any reversion to sulfide even after ten to twelve hours of retention of the oxidized black liquor in the storage tanks. The results further indicate oxidation is continuous as it takes place continuously in the oxygenation reactor and in the pipeline connecting successive reactors. The following table illustrates the succes of the oxidation and the prevention of reversion. In Table III "To Tank" is the concentration of sulfide before it enters the storage tanks and "In Tank" indicates the concentration of sulfide after the liquor is in the storage tanks. The results indicate a continued oxidation of the liquor in the storage tanks. The "average diff." is the difference in the sulfide concentration as the liquor is continuously oxidized in storage. No results in the flow average g.p.m. (gallons per minute) and sulfide oxidation in the tank in pounds of moles per hour are recorded for the first two days because of the time required for oxidation to occur in the storage tanks, since there was an initial amount of unoxidized liquor present which needed to be displaced by the oxidized liquor.

TABLE III.—BLACK LIQUOR OXIDATION—OXIDATION IN STORAGE TANKS

| Day | Time | Sulfide conc. (g./l.) | | | Flow average, g.p.m. | S⁻ oxid. in tank, lb. mole/hr. |
|---|---|---|---|---|---|---|
| | | To tank | In tank | Average difference | | |
| First | 12:25 | 3.51 | | | | |
| | 2:15 | 1.56 | | | | |
| | 4:12 | 1.85 | 2.22 | | | |
| | 5:15 | 1.37 | 2.24 | | | |
| | 7:05 | 0.27 | | | | |
| | 9:28 | 0.12 | | | | |
| | 5:08 | 1.26 | | | | |
| | 9:23 | 1.36 | | | | |
| Average | | 1.41 | 2.23 | 0.82 | | None |
| Second | 10:12 | 3.12 | 1.66 | | | |
| | 3:40 | 1.46 | 1.39 | | | |
| | 5:00 | .23 | 1.10 | | | |
| | 5:15 | .40 | | | | |
| | 6:00 | .20 | | | | |
| | 6:33 | .35 | | | | |
| | 8:00 | .15 | | | | |
| Average | | .84 | 1.37 | 0.53 | | None |
| Third | 1:10 | .24 | 0.50 | | 1,395 | |
| | 7:46 | 2.24 | 0.40 | | 1,395 | |
| | 11:00 | 1.09 | 0.47 | | 1,395 | |
| | 4:15 | .20 | | | 1,525 | |
| | 8:29 | 1.09 | 0.50 | | 1,560 | |
| | 11:42 | 1.95 | | | 1,560 | |
| Average | | 1.13 | 0.47 | −0.66 | 1,471 | 6.20 |

TABLE III—Continued

| Day | Time | Sulfide conc. (g./l.) To tank | Sulfide conc. (g./l.) In tank | Average difference | Flow average, g.p.m. | S-oxid. in tank, lb. mole/hr. |
|---|---|---|---|---|---|---|
| Fourth | 3:30 | 2.14 | | | 1,590 | |
|  | 9:28 | 3.00 | | | 895 | |
|  | 11:37 | 3.00 | 0.88 | | 895 | |
|  | 1:08 | 0.20 | 1.05 | | 895 | |
|  | 4:30 | .48 | | | | |
| Average | | 1.76 | 0.96 | −0.80 | 1,045 | 5.35 |
| Fifth | 3:07 | *2.68 | 0.45 | | 1,590 | |
|  | 10:05 | 0.70 | 0.60 | | 1,495 | |
| Average | | 0.70 | 0.52 | −0.18 | 1,543 | 1.76 |
| Sixth | 12:32 | 2.10 | | | 1,055 | |
|  | 1:13 | .75 | | | 950 | |
|  | 9:09 | 2.68 | 0.78 | | 895 | |
|  | 2:42 | 0.78 | 0.78 | | 895 | |
|  | 9:42 | 1.65 | 0.50 | | | |
| Average | | 1.59 | 0.69 | −0.90 | 1,093 | 6.29 |
| Seventh | 9:50 | 1.76 | 0.50 | | 1,525 | |
| Average | | 1.76 | 0.50 | −1.26 | 1,525 | 12.30 |
| Eighth | 7:50 | .80 | 0.35 | | 1,150 | |
| Average | | 0.80 | 0.35 | −0.45 | 1,150 | 3.31 |

EXAMPLE IV

In the next table, Table IV, the combined stoichiometric oxygen utilization achieved by using an oxygen reactor and the storage tank as a reactor, is expressed in the table as "Grand Total" for the complete oxygenation of the black liquor as set forth. The results are expressed in pound moles per hour.

TABLE IV

| Date | Time | Oxidation of compounds as $Na_2S$ — Oxidation in reactor $S^-$ | Oxidation of compounds as $Na_2S$ — Oxidation in reactor $S_2O_3^-$ | Oxidation of compounds as $Na_2S$ — Oxidation in reactor Total | Oxidation of compounds as $Na_2S$ — In tank | Oxidation of compounds as $Na_2S$ — Grand total | Oxygen utilized — Injected | Oxygen utilized — Percent stoichiometric efficiency |
|---|---|---|---|---|---|---|---|---|
| First | 1:10 | 89.82 | 3.42 | 93.24 | | | 109.90 | |
|  | 7.46 | 74.01 | 3.81 | 77.82 | | | 103.35 | |
|  | 11:00 | 89.55 | 3.95 | 93.50 | | | 108.89 | |
|  | 4:15 | 98.97 | 3.31 | 102.28 | | | 115.45 | |
|  | 8:29 | 92.35 | 3.60 | 95.95 | | | 122.34 | |
|  | 11.42 | 87.96 | 3.93 | 91.89 | | | 119.20 | |
| Average | | | | 92.44 | 6.20 | 98.64 | 113.19 | 87.20 |
| Second | 3:30 | 121.09 | 3.78 | 106.00 | | | 119.20 | |
|  | 9:28 | 46.11 | 2.29 | 48.40 | | | 67.47 | |
|  | 11:37 | 50.98 | 2.32 | 53.30 | | | 67.55 | |
|  | 1:08 | 67.02 | 2.63 | 69.65 | | | 84.34 | |
|  | 4:30 | 73.69 | 2.96 | 76.65 | | | 87.96 | |
| Average | | | | 70.84 | 5.35 | 76.19 | 85.30 | 89.30 |
| Third | 3:07 | 120.68 | 3.78 | *103.00 | | | 115.67 | |
|  | 10:05 | 97.59 | 3.66 | 101.25 | | | 111.46 | |
| Average | | | | 102.70 | 1.75 | 104.46 | 113.53 | 92.0 |
| Fourth | 12:32 | 77.65 | 4.54 | *72.50 | | | 92.75 | |
|  | 1:13 | 64.14 | 2.59 | 66.73 | | | 73.07 | |
|  | 9:09 | 63.70 | 4.26 | *60.00 | | | 84.30 | |
|  | 2:42 | 68.56 | 3.76 | 72.32 | | | 85.55 | |
|  | 9:42 | 106.35 | 4.91 | 111.26 | | | 124.10 | |
| Average | | | | 76.49 | 6.29 | 82.78 | 91.95 | 90.10 |
| Fifth | 9:50 | 100.92 | 4.80 | 105.72 | | | 115.67 | |
| Average | | | | 105.72 | 2.05 | 107.77 | 115.67 | 93.5 |
| Sixth | 7:50 | 102.30 | 5.15 | *87.90 | | | 96.39 | |
| Average | | | | 87.90 | 3.31 | 91.21 | 96.39 | 94.75 |

It is obvious to those skilled in the art to which the present invention pertains, that various modifications may be made in the method of the present invention, in light of the disclosure, without departing from the spirit and scope thereof, and it is to be understood that these modifications are to be construed as being within the invention. Having thus described the invention and illustrated it by preferred embodiments, we claim as new and desired to be protected by Letters Patent.

What is claimed is:

1. A method for continuously oxidizing black liquor obtained from the pulping of wood in which the sodium sulfide therein is oxidized to produce recoverable sulfur values therefrom, the method avoiding the undesirable formation of foam and elemental sulfur, the method including the steps of (1) oxidizing the black liquor in a substantially straight line flow through a substantially straight line reactor at a temperature of at least about 180° F. with molecular oxygen using the oxygen in an amount of about 8,000 to 44,000 cubic feet per hour of molecular oxygen for a flow rate of about 650 to 1670 gallons per minute of black liquor having an initial sodium sulfide concentration of about 9 to 15 grams per liter, and (2) oxidizing again the oxidized black liquor of step (1) in a substantially straight line flow to produce an oxidized black liquor having a final content of sodium sulfide of only about 0.2 to 4.3 grams per liter.

2. A method as defined in claim 1 in which step (2) includes oxidizing a portion of unoxidized black liquor along with the oxidized black liquor of step (1).

3. A method as defined in claim 1 in which there is provided a further step of oxidizing the oxidized black liquor of step (2) in storage.

4. A method as defined in claim 1 in which there is at least 90% conversion of the initial sodium sulfide in the black liquor.

5. A method as defined in claim 1 in which black liquor is obtained from pulping of southern pine.

6. A method for the continuous oxidation of black liquor from the pulping of wood in which the undesirable formation of foam and elemental sulfur is avoided, the method comprising the steps of (1) oxidizing continuously black liquor in a substantially straight line flow at a flow rate of about 650 to 1670 gallons per minute and having an initial sodium sulfite content of about 9 to 15 grams per liter with about 8,000 to 44,000 cubic feet per hour of molecular oxygen in which the molar ratio of oxygen to sulfide is about 1.05:1 to 1.20:1 and (2) repeating the oxidizing of step (1) to provide a final sodium sulfide concentration in the black liquor product of about 0.2 to 4.3 grams per liter.

7. A method as defined in claim 6 in which the molar ratio of oxygen to sulfide is about 1.05:1 to 1.10:1.

8. A method as defined in claim 1 in which there is provided the step of controlling the amount of oxygen used to oxidize the black liquor in step (1) according to the flow rate of the unoxidized black liquor and the initial sulfide concentration thereof, the molar ratio of oxygen to sodium sulfide being about 1.05:1 to 1.20:1.

9. A method of oxidizing black liquor from the pulping of wood comprising the steps of (1) supplying black pulping liquor into a first substantially straight-line reaction chamber in a substantially straight line flow at a rate of about 650 to 1670 gallons per minute in which the black liquor has a sulfide concentration of about 9 to 15 grams per liter, (2) supplying about 8,000 to 44,000 cubic feet per hour of oxygen to the black liquor for oxidation thereof in a substantially straight line flow, (3) mixing the black liquor and the molecular oxygen by intimate and turbulent contact in the first reaction chamber, (4) moving the mixed oxygen and black liquor to a second reaction chamber in a substantially straight line flow in a pipe to further mix by turbulent contact the oxygen and black liquor and to oxidize the black liquor, (5) oxidizing the black liquor from step (4) in a second substantially straight line reaction chamber, and (6) further oxidizing the black liquor of step (6) in a straight line flow in a pipe to provide a final sodium sulfide concentration of only about 0.2 to 4.3 grams per liter.

10. A method as defined in claim 9 in which there is a further step of providing some unoxidized black liquor to the second reaction chamber for mixing with the oxygen and oxidized black liquor of the first chamber in step (5) to thereby efficiently oxidize the black liquor to decrease sulfur compound emissions to the atmosphere without excess foaming and undesirable formation of elemental sulfur.

References Cited

UNITED STATES PATENTS

| | | | |
|---|---|---|---|
| 3,549,314 | 12/1970 | Shah | 23—49 |
| 3,567,400 | 3/1971 | Shah | 23—49 X |

EARL C. THOMAS, Primary Examiner

U.S. Cl. X.R.

162—30; 423—514